United States Patent
Shindo et al.

(10) Patent No.: US 11,840,427 B2
(45) Date of Patent: Dec. 12, 2023

(54) CRANE

(71) Applicant: TADANO LTD., Kagawa (JP)

(72) Inventors: Masaki Shindo, Kagawa (JP); Hiroshi Yamauchi, Kagawa (JP); Hiroki Mizobuchi, Kagawa (JP); Naoki Ishihara, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 1122 days.

(21) Appl. No.: 16/492,406

(22) PCT Filed: Mar. 7, 2018

(86) PCT No.: PCT/JP2018/008833
§ 371 (c)(1),
(2) Date: Sep. 9, 2019

(87) PCT Pub. No.: WO2018/164199
PCT Pub. Date: Sep. 13, 2018

(65) Prior Publication Data
US 2021/0139292 A1 May 13, 2021

(30) Foreign Application Priority Data
Mar. 9, 2017 (JP) .................. 2017-045233

(51) Int. Cl.
*B66C 13/12* (2006.01)
*H02J 50/80* (2016.01)
(Continued)

(52) U.S. Cl.
CPC .............. *B66C 13/12* (2013.01); *B66C 13/44* (2013.01); *H02J 50/00* (2016.02); *H02J 50/10* (2016.02);
(Continued)

(58) Field of Classification Search
CPC ... B66C 13/12; B66C 13/40; B66C 2700/085; H02J 50/00; H02J 50/10; H02J 50/20; H02J 50/80
See application file for complete search history.

(56) References Cited

U.S. PATENT DOCUMENTS

2009/0297275 A1* 12/2009 Davis ............... F16L 1/028
212/258
2013/0234507 A1* 9/2013 Kim ............... H01F 38/18
307/9.1

FOREIGN PATENT DOCUMENTS

JP S63-138738 U 9/1988
JP S63-266292 A 11/1988
(Continued)

OTHER PUBLICATIONS

Dec. 16, 2020, European Search Report issued for related EP application No. 18764905.8.
(Continued)

*Primary Examiner* — Zachary L Kuhfuss
(74) *Attorney, Agent, or Firm* — Paratus Law Group, PLLC

(57) ABSTRACT

A crane comprising a traveling body and a turning body turnably supported by the traveling body, the crane performing power feeding and communication between the traveling body and the turning body. The traveling body is provided with: a power supply; a lower controller which controls the traveling body and transmits power to the devices included in the traveling body; and a lower transmitter-receiver which wirelessly transmits and receives the power and data signal from the power supply. The turning body is provided with: an upper controller which controls the turning body and transmits power to the devices included in the turning body; and an upper transmitter-receiver which wirelessly transmits
(Continued)

and receives the power and data signal to and from the lower transmitter-receiver.

4 Claims, 3 Drawing Sheets

(51) Int. Cl.
*H02J 50/10* (2016.01)
*H02J 50/20* (2016.01)
*B66C 13/44* (2006.01)
*H02J 50/00* (2016.01)

(52) U.S. Cl.
CPC .............. *H02J 50/20* (2016.02); *H02J 50/80* (2016.02); *B66C 2700/085* (2013.01)

(56) References Cited

FOREIGN PATENT DOCUMENTS

| | | |
|---|---|---|
| JP | 2002-178959 A | 3/2002 |
| JP | 2006-103879 A | 4/2006 |
| JP | 2009-256089 A | 11/2009 |

OTHER PUBLICATIONS

Yong-Ho Son et al., Simultaneous Data and Power Transmission in Resonant Wireless Power System, Nov. 5-8, 2013, pp. 1003-1005, 2013 Asia-Pacific Microwave Conference Proceedings, Seoul, South Korea.

Rajeev Mehrotra, Cut the Cord: Wireless Power Transfer, its Applications, and its limits, Retrieved from: http://www.cse.wustl.edu/-jain/cse74-14/ftp/power/index html, Apr. 30, 2014, pp. 1-11, Washington University in St. Louis.

Aug. 7, 2023, European Communication issued for related EP Application No. 18764905.8.

\* cited by examiner

CRANE

CROSS REFERENCE TO PRIOR APPLICATION

This application is a National Stage Patent Application of PCT International Patent Application No. PCT/JP2018/008833 (filed on Mar. 7, 2018) under 35 U.S.C. § 371, which claims priority to Japanese Patent Application No. 2017-045233 (filed on Mar. 9, 2017), which are all hereby incorporated by reference in their entirety.

TECHNICAL FIELD

The present invention relates to a technique of wireless power feeding and wireless communication between a traveling body and a swivel body of a crane.

BACKGROUND ART

Conventionally, a crane in which a slip ring is disposed between a traveling body and a swivel body for power feeding and communication is known. Patent Literature (hereinafter, referred to as "PTL") 1 discloses reducing an increase in communication amount via a slip ring by wireless communication between a traveling body and a swivel body and by providing, in the swivel body side, a battery and a generator for feeding electrical power to communication equipment.

CITATION LIST

Patent Literature

PTL 1
Japanese Patent Application Laid-Open No. 2009-256089

SUMMARY OF INVENTION

Technical Problem

A work machine described in PTL 1 includes communication equipment for wireless communication between the traveling body and the swivel body, and the generator and/or the battery for power feeding. That is, the swivel body is provided with the communication equipment, generator, and battery, which causes extensive equipment. Moreover, disposing the slip ring causes unavoidable problems accompanying the slip ring, such as the necessity of wiring to the slip ring and the wearing of the slip ring itself.

Solution to Problem

A crane, including: a traveling body; and a swivel body swivelably supported on the traveling body, in which: power feeding and communication are performed between the traveling body and the swivel body, the traveling body includes a power supply device, a lower controller that controls the traveling body and transfers electrical power to devices included in the traveling body, and a lower transmission and reception device that wirelessly transmits or receives the electrical power from the power supply device or a data signal, and the swivel body includes an upper controller that controls the swivel body and transfers the electrical power to devices included in the swivel body, and an upper transmission and reception device that wirelessly transmits or receives the electrical power or a data signal to or from the lower transmission and reception device.

It is preferable that the lower transmission and reception device and the upper transmission and reception device be disposed at a center around which the swivel body swivels.

Advantageous Effects of Invention

According to the present invention, it is possible to dispense with the slip ring by wireless power feeding and wireless communication between the traveling body and the swivel body, so as to solve the problems accompanying the use of the slip ring.

DESCRIPTION OF EMBODIMENTS

Figure 1:
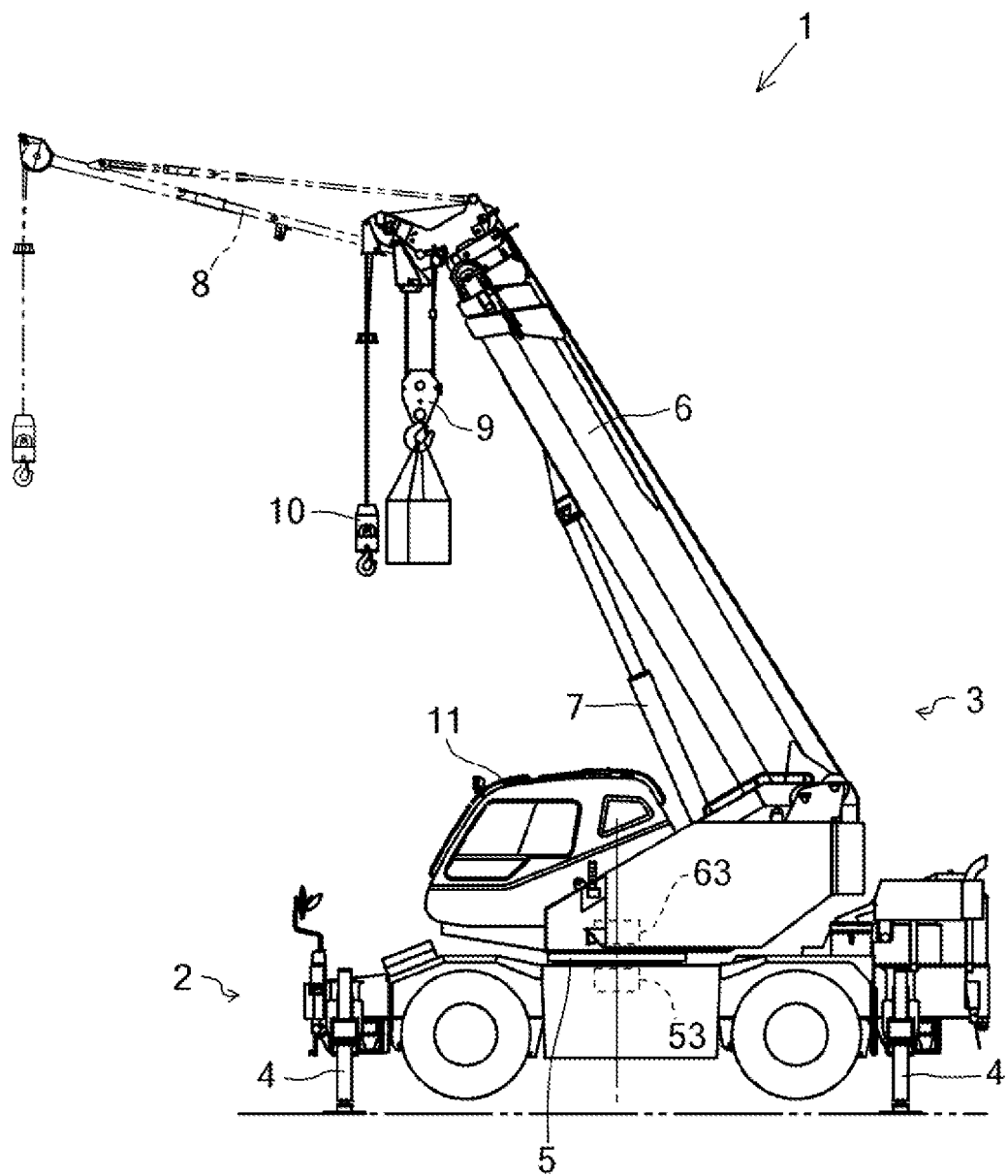
FIG. 1 is a side view of a crane.
Figure 2:
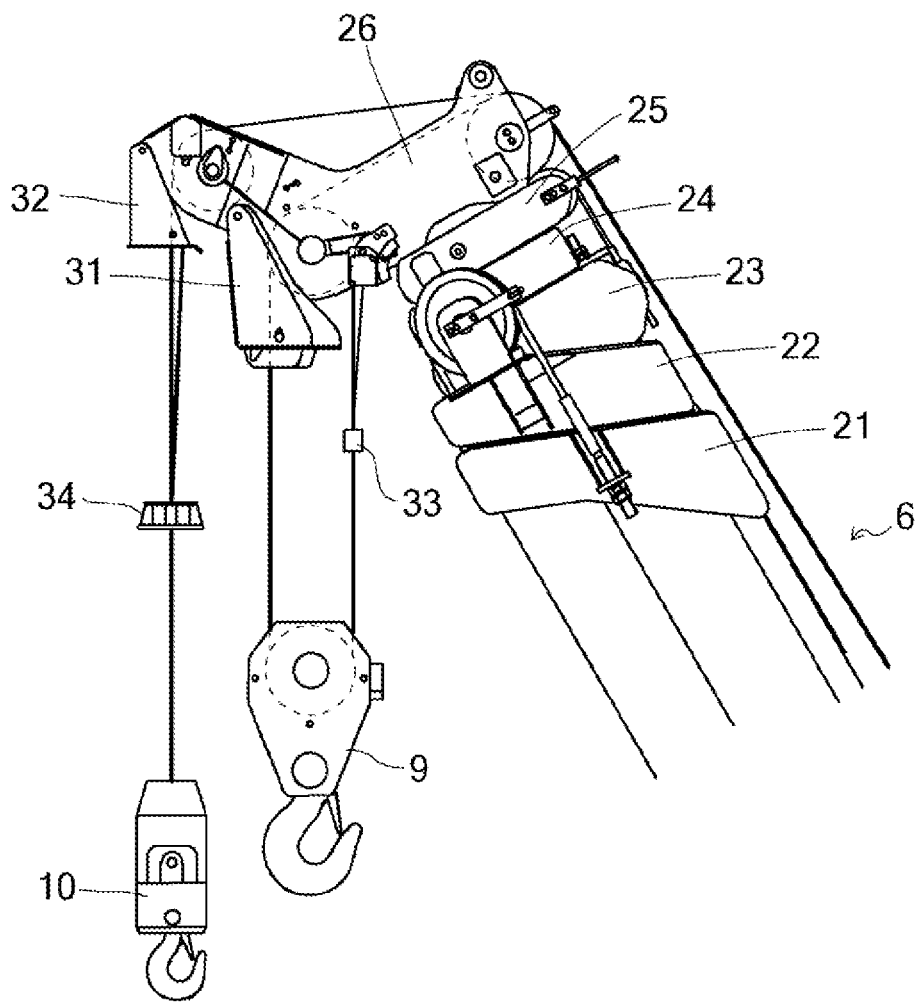
FIG. 2 is an enlarged side view illustrating a tip portion of a telescopic boom of the crane.
Figure 3:
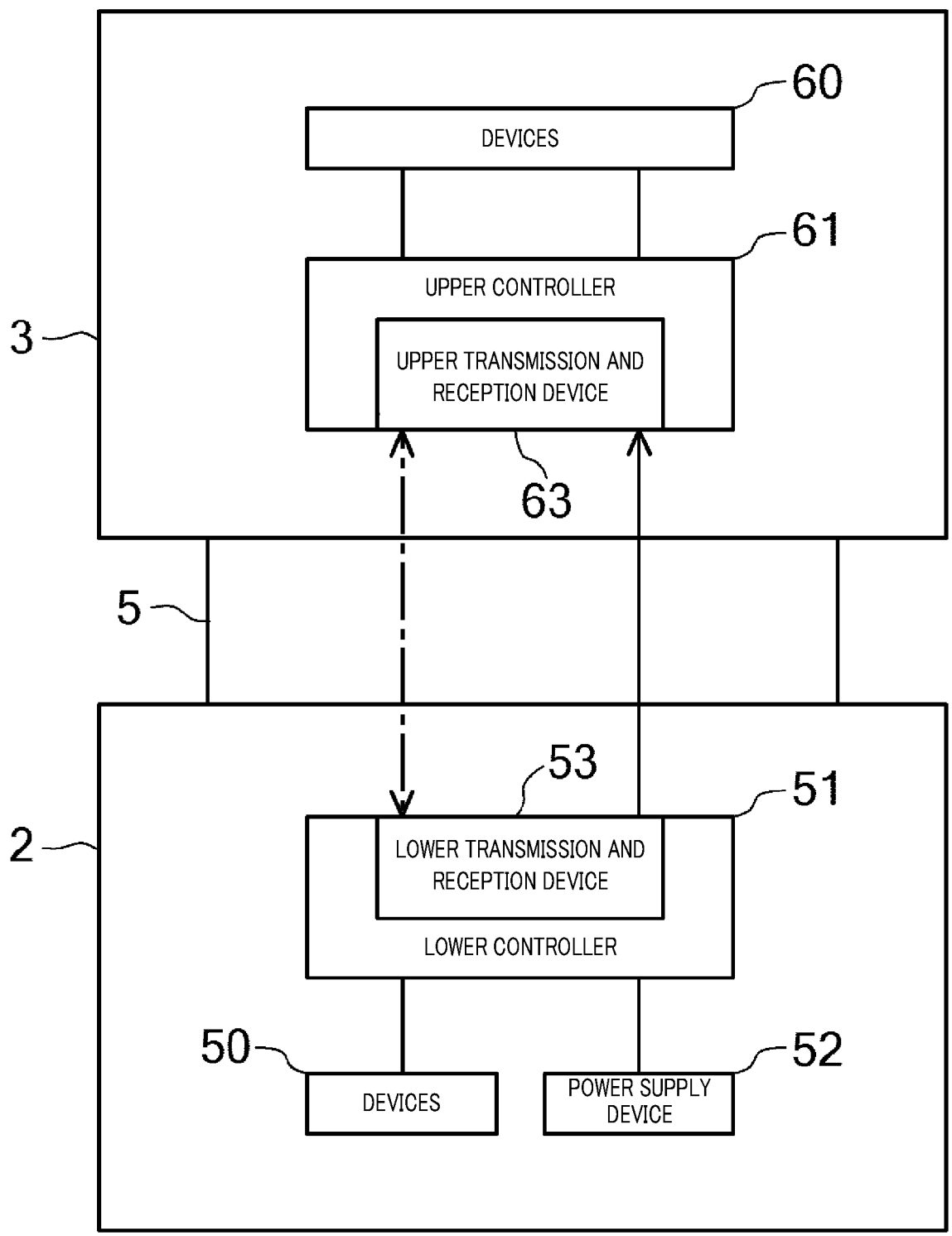
FIG. 3 illustrates a system configuration of the crane.

An entire configuration of crane 1 will be described with reference to FIGS. 1 to 3. Crane 1 is a mobile crane and includes traveling body 2 and swivel body 3. Note that, although an embodiment of the present invention will be described in relation to a mobile crane as crane 1 by way of an example, crane 1 may be of any type as long as power feeding and communication are performed between traveling body 2 and swivel body 3.

Traveling body 2 includes outriggers 4 disposed at four corners of a vehicle body. Outriggers 4 are composed of projecting beams hydraulically extendable on both sides of traveling body 2 in the width direction, and hydraulic jack cylinders extendable in the direction vertical to the ground. Traveling body 2 can stably support crane 1 to extend a workable range by extending the beams of outriggers 4 in the width direction of the vehicle and bringing the jack cylinders into contact with the ground.

Swivel body 3 includes swivel base 5, telescopic boom 6, luffing cylinder 7, jib 8, main hook 9, sub hook 10, cabin 11, and the like.

Swivel base 5 allows swivel body 3 to swivel, and is disposed on the frame of traveling body 2 via an annular bearing. That is, swivel base 5 supports swivel body 3 such that swivel body 3 can swivel with respect to traveling body 2. Telescopic boom 6 and cabin 11 internally having an operator's seat are disposed on swivel base 5. Telescopic boom 6 is composed of a plurality of nested boom members. Telescopic boom 6 is configured to be able to extend and retract by moving the boom members by a hydraulic telescopic cylinder. Luffing cylinder 7 is a hydraulic cylinder, which extends and retracts to luff telescopic boom 6 while keeping the attitude of telescopic boom 6.

Jib 8 is coupled to the tip of telescopic boom 6 to expand the working area of swivel body 3. In swivel body 3, a load can be engaged with main hook 9 or sub hook 10, and the load can be raised or lowered by winding up a wire rope or feeding out the wire rope while the load is engaged.

Telescopic boom 6 supports the wire rope such that a load can be hoisted. Telescopic boom 6 includes a plurality of boom members of base boom 21, second boom 22, third boom 23, forth boom 24, fifth boom 25, and top boom 26 in this order from the base end to the tip. The boom members are formed into such sizes that the boom members can be inserted in one another in the order of cross-sectional area, and are telescopically inserted in one another in the order from the base end side.

Main bracket 31 and sub bracket 32 are rotatably attached to the tip of top boom 26. An overwinding prevention switch 33 is hung downward from main bracket 31. Overwinding prevention switch 33 is a detection switch being a part of an overwinding prevention device for detecting overwinding of the wire rope, and detects contact with main hook 9. Similarly, an overwinding prevention switch 34 is hung downward from sub bracket 32. Overwinding prevention switch 34 is a detection switch being a part of the overwinding prevention device for detecting overwinding of the wire rope, and detects contact with sub hook 10.

Moreover, in addition to the overwinding prevention device, various equipment which needs to communicate, such as a load weight detection device for detecting the weight of a load applied on telescopic boom 6, image capturing device for obtaining an image of a downward view from telescopic boom 6, and/or the like is disposed in the tip of telescopic boom 6.

Traveling body 2 includes: devices 50 that include an engine, a sensor for detecting a state of the engine, and the like and that serve to allow traveling body 2 to travel; lower controller 51 that receives detected signals from devices 50 and controls devices 50; and power supply device 52 that feeds electrical power to devices 50, lower controller 51, and each part of crane 1.

Devices 50 are electrically connected to lower controller 51, and transmit the detected signals detected by devices 50 to lower controller 51. Lower controller 51 transmits a control signal to devices 50 to control the operation of devices 50.

Power supply device 52 is connected to lower controller 51, and feeds electrical power to lower controller 51. The electrical power from power supply device 52 is distributed to devices 50 by lower controller 51.

Swivel body 3 is disposed to be swivelable by swivel base 5 with respect to traveling body 2. Swivel body 3 includes: devices 60 that include a hydraulic cylinder for luffing, extending, or retracting telescopic boom 6, a winch for winding up the wire rope, an operational means such as a lever, button, and/or the like for operating crane 1, various equipment as described above, a sensor for detecting the state of telescopic boom 6, and the like and that serve to achieve the crane work of swivel body 3; and upper controller 61 that receives detected signals from devices 60 and controls devices 60.

Lower controller 51 includes lower transmission and reception device 53 that wirelessly transmits or receives electrical power or a data signal. Upper controller 61 includes upper transmission and reception device 63 that wirelessly transmits or receives electrical power or a data signal. Lower transmission and reception device 53 and upper transmission and reception device 63 can transmit or receive the electrical power or the data signal to or from each other.

Electromagnetic induction and/or magnetic field resonance using coils, microwave power feeding using microwaves, or the like can be employed appropriately as a technique of wireless power feeding between these transmission and reception devices 53 and 63. In addition, as the technique of wireless power feeding between transmission and reception devices 53 and 63, it is possible to employ a technique of transferring electrical power and a data signal simultaneously by superimposing the data signal on the electrical power when wirelessly feeding electrical power by the electromagnetic induction or magnetic field resonance. It is also possible to employ a technique of transferring electrical power and a data signal separately by providing separate antennas for wireless power feeding and wireless communication when feeding electrical power by the microwaves.

Lower transmission and reception device 53 and upper transmission and reception device 63 are disposed to face the center around which swivel body 3 swivels. That is, transmission and reception devices 53 and 63 are disposed such that their relative positions are not changed by the swiveling of swivel body 3 caused by swivel base 5. Disposing transmission and reception devices 53 and 63 in the way described above makes it possible to prevent the positional relationship between transmission and reception devices 53 and 63 from being changed, so as to maintain high power feeding efficiency.

As described above, lower transmission and reception device 53 included in lower controller 51 wirelessly feeds electrical power to and wirelessly communicates with upper transmission and reception device 63 included in upper controller 61. Then, upper controller 61 having received power feeding from lower controller 51 transfers and distributes the electrical power to devices 60.

As described above, wireless power feeding and wireless communication are achieved between traveling body 2 and swivel body 3 by using transmission and reception devices 53 and 63. It is thus possible to dispense with a power-feeding and communication system via a slip ring that a conventional swivel base includes, and/or wiring in connection with this power-feeding and communication system, so as to avoid wearing of the slip ring and the physical damage to the wiring. Moreover, there is no such limitation as that imposed on the number of data signals exchanged through the slip ring, so that it is possible to easily add another device to devices 50 included in traveling body 2 or to devices 60 included in swivel body 3, that is, to additionally install a sensor, a measuring instrument, or a device easily.

INDUSTRIAL APPLICABILITY

The present invention is applicable to a crane.

REFERENCE SIGNS LIST

1 Crane
2 Traveling body
3 Swivel body
5 Swivel base
51 Lower controller
53 Lower transmission and reception device
61 Upper controller
63 Upper transmission and reception device

The invention claimed is:
1. A crane, comprising:
a traveling body including first devices that serve to allow the traveling body to travel; and
a swivel body swivelably supported on the traveling body and including second devices for achieving crane work, wherein:
power feeding and communication are performed between the traveling body and the swivel body,
the traveling body includes a power supply device, a lower transmission and reception device for feeding electrical power from the power supply device to the swivel body and for transmitting and receiving a data signal to and from the swivel body, and a lower controller that receives detected signals from the first devices and controls the first devices and the traveling body, and transfers the electrical power from the power supply device to the first devices and the lower transmission and reception device, the swivel body includes an upper transmission and reception device for receiving the electrical power fed from the lower transmission and reception device and for transmitting or receiving the data signal to or from the lower transmission and reception device, and an upper controller that receives detected signals from the second devices and controls the second devices and the swivel body and transfers electrical power received by the upper transmission and reception device to the second devices, and the receiving and feeding of the electrical power and the transmitting and receiving of the data signal between the lower transmission and reception device and the upper transmission and reception device are performed wirelessly.

2. The crane according to claim 1, wherein
the lower transmission and reception device and the upper transmission and reception device are disposed at a center around which the swivel body swivels.

3. The crane according to claim 1, wherein
the electrical power and the data signal are simultaneously transferred between the upper transmission and reception device and the lower transmission and reception device by feeding or receiving the electrical power by an electromagnetic induction method or a magnetic field resonance method and by superimposing the data signal on the electrical power.

4. The crane according to claim 1, wherein
the electrical power and the data signal are separately transferred between the upper transmission and reception device and the lower transmission and reception device via separate antennas by feeding or receiving the electrical power by a microwave power feeding method.

* * * * *